(12) United States Patent
Yoshida et al.

(10) Patent No.: US 11,323,238 B2
(45) Date of Patent: May 3, 2022

(54) FRAME SYNCHRONIZATION APPARATUS, OPTICAL COMMUNICATION APPARATUS, AND FRAME SYNCHRONIZATION METHOD

(71) Applicants: NTT ELECTRONICS CORPORATION, Yokohama (JP); NIPPON TELEGRAPH AND TELEPHONE CORPORATION, Tokyo (JP)

(72) Inventors: Mitsuteru Yoshida, Yokohama (JP); Yasuyuki Endoh, Yokohama (JP); Katsuichi Oyama, Yokohama (JP); Masayuki Ikeda, Yokohama (JP); Tsutomu Takeya, Yokohama (JP); Etsushi Yamazaki, Tokyo (JP); Yoshiaki Kisaka, Tokyo (JP); Masahito Tomizawa, Tokyo (JP)

(73) Assignees: NTT ELECTRONICS CORPORATION, Yokohama (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/972,531

(22) PCT Filed: Jun. 6, 2019

(86) PCT No.: PCT/JP2019/022530
§ 371 (c)(1),
(2) Date: Dec. 4, 2020

(87) PCT Pub. No.: WO2019/235568
PCT Pub. Date: Dec. 12, 2019

(65) Prior Publication Data
US 2021/0273777 A1 Sep. 2, 2021

(30) Foreign Application Priority Data

Jun. 7, 2018 (JP) .............................. JP2018-109398

(51) Int. Cl.
*H04L 7/00* (2006.01)
*H04L 7/04* (2006.01)
(Continued)

(52) U.S. Cl.
CPC ................ *H04L 7/042* (2013.01); *H04L 7/00* (2013.01); *H04L 7/0075* (2013.01);
(Continued)

(58) Field of Classification Search
CPC ......... H04L 7/042; H04L 7/00; H04L 7/0075; H04L 27/227; H04B 10/5561; H04B 10/613
(Continued)

(56) References Cited

U.S. PATENT DOCUMENTS 5,301,195 A * 4/1994 Hasegawa ............. H04J 3/0608
370/510
5,475,710 A 12/1995 Ishizu et al.
(Continued)

FOREIGN PATENT DOCUMENTS

EP 0551081 A2 7/1993
EP 0860962 A2 8/1998
(Continued)

OTHER PUBLICATIONS

International Preliminary Report on Patentability received for PCT Patent Application No. PCT/JP2019/022530, dated Dec. 17, 2020, 13 pages (8 pages of English Translation and 5 pages of Original Document).
(Continued)

*Primary Examiner* — Don N Vo
(74) *Attorney, Agent, or Firm* — Womble Bond Dickinson (US) LLP

(57) ABSTRACT

A frame synchronization apparatus (10) according to this invention includes a multiplication unit (11) configured to multiply a received signal by an inverse complex number of a predetermined synchronization pattern with respect to a predetermined signal point on a complex space diagram for each of a plurality of symbols of the received signal, an addition average unit (12) configured to perform addition averaging of outputs from the multiplication unit for the plurality of symbols of the received signal, and a synchronization determination unit (13) configured to perform coincidence determination of whether an output from the addition average unit (12) falls within a predetermined coincidence determination range of the predetermined signal point, and determine a synchronization state of the frame synchronization based on a result of the coincidence determination. According to this invention, it is possible to provide a frame synchronization apparatus that correctly determines a synchronization state even if an error rate of received symbols is high.

11 Claims, 14 Drawing Sheets

(51) Int. Cl.
  *H04L 27/227* (2006.01)
  *H04B 10/556* (2013.01)
  *H04B 10/61* (2013.01)
(52) U.S. Cl.
  CPC ........ *H04L 27/227* (2013.01); *H04B 10/5561* (2013.01); *H04B 10/613* (2013.01)
(58) Field of Classification Search
  USPC .................................. 375/364–368; 398/154
  See application file for complete search history.

(56) References Cited

U.S. PATENT DOCUMENTS

| | | | | |
|---|---|---|---|---|
| 5,883,929 | A  * | 3/1999  | Wang ..................... | H04L 7/046 |
| | | | | 375/367 |
| 6,658,072 | B1 * | 12/2003 | Asanuma ................ | H04L 7/041 |
| | | | | 375/365 |
| 2007/0116065 | A1 * | 5/2007 | Kawasaki ............ | H04L 27/205 |
| | | | | 370/516 |

FOREIGN PATENT DOCUMENTS

| | | |
|---|---|---|
| JP | 05-191208 A | 7/1993 |
| JP | 08-088626 A | 4/1996 |
| JP | 2001-189716 A | 7/2001 |
| JP | 2007-150472 A | 6/2007 |
| JP | 2011-176470 A | 9/2011 |
| JP | 2013-240036 A | 11/2013 |
| JP | 2014-003507 A | 1/2014 |
| JP | 2014-155194 A | 8/2014 |
| JP | 2017-005467 A | 1/2017 |

OTHER PUBLICATIONS

International Search Report and Written Opinion received for PCT Patent Application No. PCT/JP2019/022530, dated Aug. 13, 2019, 14 pages (7 pages of English Translation and 7 pages of Original Document).
International Telecommunication Union, "Series G: Transmission Systems and Media, Digital Systems and Networks, Digital terminal equipments—General, Series Y: Global Information Infrastructure, Internet Protocol Aspects and Next-Generation Networks, Internet of Things and Smart Cities", ITU-T, Telecommunication Standardization Sector of ITU, G.709/Y.1331, Jun. 2016, 244 pages.

* cited by examiner

FIG.1A
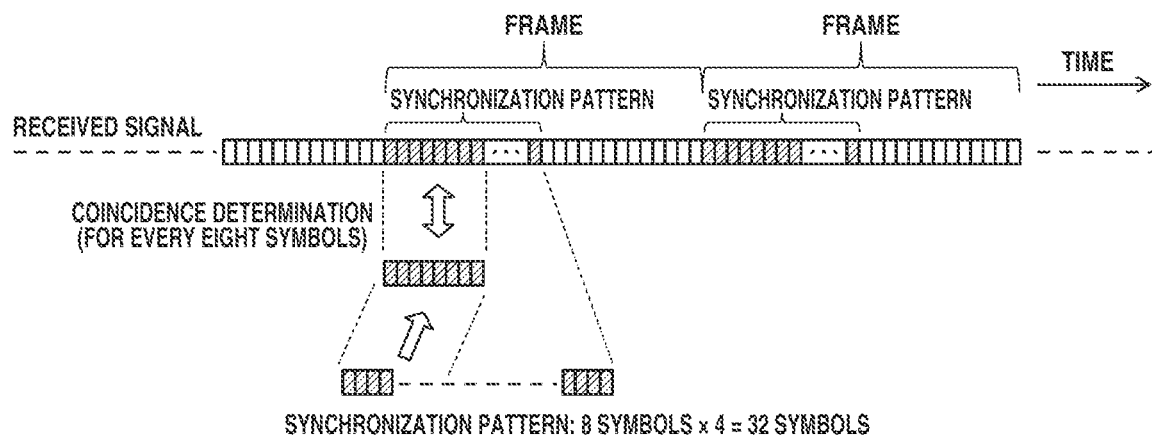
FIG.1B
| n | 0 | 1 | 2 | 3 | 4 | 5 | 6 | 7 |
|---|---|---|---|---|---|---|---|---|
| $I_S(n)$ | 1 | 1 | -1 | 1 | -1 | -1 | -1 | 1 |
| $Q_S(n)$ | 1 | 1 | -1 | 1 | -1 | -1 | -1 | 1 |
FIG.2
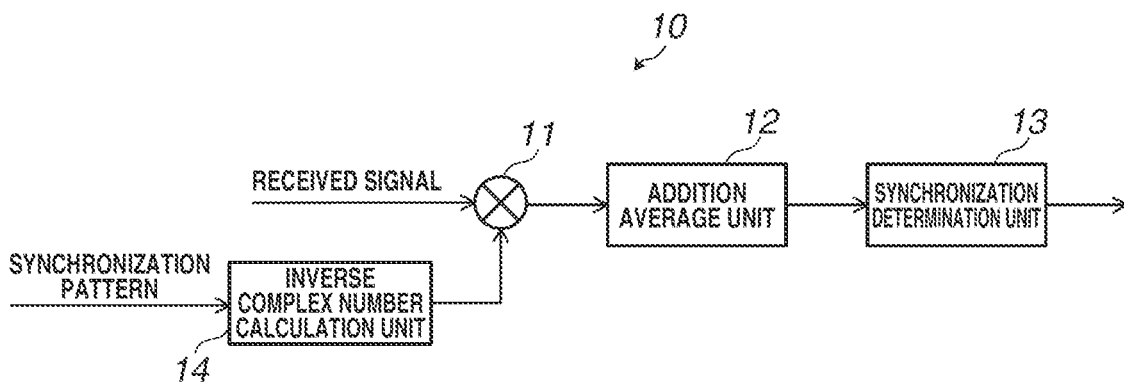

| TRANSMISSION I | TRANSMISSION Q | RECEPTION I | RECEPTION Q | INVERSE COMPLEX I | INVERSE COMPLEX Q | MULTIPLICATION RESULT I | MULTIPLICATION RESULT Q |
|---|---|---|---|---|---|---|---|
| 1 | 1 | -1 | 1 | 1 | 0 | -1 | 1 |
| 1 | -1 | 1 | 1 | 0 | 1 | -1 | 1 |
| -1 | 1 | -1 | -1 | 0 | -1 | -1 | 1 |
| 1 | 1 | -1 | 1 | 1 | 0 | -1 | 1 |
| -1 | -1 | 1 | -1 | -1 | 0 | -1 | 1 |
| -1 | 1 | -1 | -1 | 0 | -1 | -1 | 1 |
| -1 | -1 | 1 | -1 | -1 | 0 | -1 | 1 |
| 1 | -1 | 1 | 1 | 0 | 1 | -1 | 1 |
| | | | | | ADDITION AVERAGE | -1 | 1 |

| TRANSMISSION I | TRANSMISSION Q | RECEPTION I | RECEPTION Q | I CODE | Q CODE | RECEPTION I×I CODE | RECEPTION Q×Q CODE |
|---|---|---|---|---|---|---|---|
| 1 | 1 | -1.2 | 1.3 | 1 | 1 | -1.2 | 1.3 |
| 1 | 1 | 0.9 | 1.1 | 1 | 1 | 0.9 | 1.1 |
| -1 | -1 | 0.9 | -1.1 | -1 | -1 | -0.9 | 1.1 |
| 1 | 1 | 0.8 | 1.2 | 1 | 1 | 0.8 | 1.2 |
| -1 | -1 | -0.9 | 1.1 | -1 | -1 | 0.9 | -1.1 |
| -1 | -1 | 1.2 | -0.8 | -1 | -1 | -1.2 | 0.8 |
| -1 | -1 | -1 | -1.5 | -1 | -1 | 1 | 1.5 |
| 1 | 1 | 1.3 | 1 | 1 | 1 | 1.3 | 1 |
| | | | | | ADDITION AVERAGE | 0.2 | 0.8625 |
| | | | | | ABSOLUTE VALUE | 0.2 | 0.8625 |

| TRANSMISSION I | TRANSMISSION Q | RECEPTION I | RECEPTION Q | I CODE | Q CODE | RECEPTION I×I CODE | RECEPTION Q×Q CODE |
|---|---|---|---|---|---|---|---|
| 1 | 1 | -1.2 | -1.1 | 1 | 1 | -1.2 | -1.1 |
| 1 | 1 | -0.9 | -1 | 1 | 1 | -0.9 | -1 |
| -1 | -1 | 1.2 | -0.9 | -1 | -1 | -1.2 | -0.9 |
| 1 | 1 | -0.8 | -1.1 | 1 | 1 | -0.8 | -1.1 |
| -1 | -1 | 1.3 | 1.1 | -1 | -1 | -1.3 | -1.1 |
| -1 | -1 | 0.7 | 0.8 | -1 | -1 | -0.7 | -0.8 |
| -1 | -1 | 1 | 1.2 | -1 | -1 | -1 | -1.2 |
| 1 | 1 | -0.8 | -1.2 | 1 | 1 | -0.8 | -1.2 |
| | | | | | AVERAGE | -0.9875 | -1.05 |
| | | | | | ABSOLUTE VALUE | 0.9875 | 1.05 |

| TRANSMISSION I | TRANSMISSION Q | RECEPTION I | RECEPTION Q | I CODE | Q CODE | RECEPTION I·I CODE | RECEPTION Q·Q CODE |
|---|---|---|---|---|---|---|---|
| 1 | 1 | -1.1 | 1.2 | 1 | 1 | -1.1 | 1.2 |
| 1 | 1 | -1 | 0.9 | 1 | 1 | -1 | 0.9 |
| -1 | -1 | 0.9 | -1.2 | -1 | -1 | -0.9 | 1.2 |
| 1 | 1 | -1.1 | 0.8 | 1 | 1 | -1.1 | 0.8 |
| -1 | -1 | 1.1 | -1.3 | -1 | -1 | -1.1 | 1.3 |
| -1 | -1 | 0.8 | -0.7 | -1 | -1 | -0.8 | 0.7 |
| -1 | -1 | 1.2 | -1 | -1 | -1 | -1.2 | 1 |
| 1 | 1 | -1.2 | 0.8 | 1 | 1 | -1.2 | 0.8 |
| | | | | | AVERAGE VALUE | -1.05 | 0.9875 |
| | | | | | ABSOLUTE VALUE | 1.05 | 0.9875 |

○ : RECEIVED SIGNAL   ⟷ : DISTANCE BETWEEN RECEIVED SIGNAL AND SPACE PATTERN
● : SYNCHRONIZATION PATTERN

FRAME SYNCHRONIZATION APPARATUS, OPTICAL COMMUNICATION APPARATUS, AND FRAME SYNCHRONIZATION METHOD

TECHNICAL FIELD

The present invention relates to a frame synchronization apparatus for establishing frame synchronization by detecting a synchronization pattern included in a received signal in data communication.

BACKGROUND ART

In coherent optical communication, a reception side attempts to increase a capacity by compensating for the transmission characteristic by accurate timing synchronization. In timing synchronization, a frame synchronization pattern (SP signal) inserted in advance for each frame of a received signal is used, and whether the SP signal can be detected accurately and quickly influences performance for increasing the capacity. Since, in optical communication, a symbol error rate becomes high due to polarization dispersion to degrade the transmission characteristic, it is important to accurately detect the SP signal to establish synchronization and maintain the synchronization state even in this situation. Furthermore, in a phase modulation system, it is necessary to cope with synchronization loss caused by a phase slip.

Patent literature 1 describes, as a method of establishing frame synchronization, a method of comparing, for each bit, a bit stream at a synchronization check position with the defined bit pattern of a synchronization flag, comparing the number of coincident bits with a threshold, and determining, based on a comparison result, whether the bitstream at the synchronization check position is a true synchronization flag. Furthermore, patent literature 1 proposes a synchronization determination method based on the feature amount of an error pattern as a method of solving a problem that the success probability of synchronization establishment is decreased by setting a threshold that is not always optimum.

Patent literature 2 describes a method in which deterioration in transmission quality caused by a phase slip is avoided without using differential encoding by performing reference signal encoding for some of information bits in a frame to process them as a synchronization pattern, and the transmission quality is improved by decreasing redundant signals. In addition, patent literature 3 describes a method of establishing frame synchronization from correlation. Patent literature 4 describes a method in which even if a phase slip occurs, a synchronization pattern is detected to establish frame synchronization by calculating a correlation value with synchronization patterns inverted with each other.

In a multi-frame structure having a structure of a cycle longer than the above-described frame synchronization, it is necessary to establish multi-frame synchronization by detecting the head of a multi-frame. In non-patent literature 1, a mechanism of inserting MFAS (Multi-Frame Alignment Signal) as a multi-frame number to a partial region of an OTU (Optical-channel Transport Unit) frame is standardized. In multi-frame synchronization, if a multi-frame number is correctly determined, a multi-frame synchronization is established at a correct time position, the synchronization state is held, and then a multi-frame position is shifted, it is necessary to detect multi-frame synchronization loss.

RELATED ART LITERATURE

Non-Patent Literature

Non-Patent Literature 1: ITU-T Recommendation G.709

PATENT LITERATURE

Patent Literature 1: Japanese Patent Laid-Open No. 2001-189716
Patent Literature 2: Japanese Patent Laid-Open No. 2014-3507
Patent Literature 3: Japanese Patent Laid-Open No. 2011-176470
Patent Literature 4: Japanese Patent Laid-Open No. 2017-5467

DISCLOSURE OF INVENTION

Problem to be Solved by the Invention

However, in the conventional frame synchronization method, if the error rate of received symbols is high, an error occurs in determination of coincidence/non-coincidence between the received symbols and a synchronization pattern, and the synchronization state is then erroneously determined. For example, synchronization loss is determined despite the synchronization state or the synchronization state is determined despite synchronization loss.

Furthermore, in multi-frame synchronization, bit information obtained by performing hard decision for received symbols includes an error, and coincidence/non-coincidence of the head position of a multi-frame is determined based on the information including the error. Therefore, in a state in which the error rate of the received symbols is high, if the multi-frame position is shifted, it is impossible to correctly detect multi-frame synchronization loss.

The present invention has been made in consideration of the above problems, and has as its object to provide a frame synchronization apparatus for correctly determining a synchronization state even if the error rate of received symbols is high, and provide a frame synchronization apparatus for correctly detecting synchronization loss while correctly establishing synchronization in multi-frame synchronization.

Means of Solution to the Problem

In order to solve the above-described problems, a frame synchronization apparatus according to the present invention is a frame synchronization apparatus for establishing frame synchronization by detecting a predetermined synchronization pattern included in a received signal, comprising a multiplication unit configured to multiply the received signal by an inverse complex number of the predetermined synchronization pattern with respect to a predetermined signal point on a signal space diagram for each of a plurality of symbols of the received signal, an addition average unit configured to perform addition averaging of outputs from the multiplication unit for the plurality of symbols of the received signal, and a synchronization determination unit configured to perform coincidence determination of whether an output from the addition average unit falls within a predetermined coincidence determination range of the predetermined signal point, and determine a synchronization state of the frame synchronization based on a result of the coincidence determination.

In order to solve the above-described problems, a frame synchronization apparatus according to the present invention is a frame synchronization apparatus for performing frame synchronization by detecting a predetermined synchronization pattern included in a received signal, comprising a multiplication unit configured to multiply the received signal by a code of each symbol of the synchronization pattern for each of a plurality of symbols of the received signal, an addition average unit configured to perform addition averaging of outputs from the multiplication unit for the plurality of symbols of the received signal, and a synchronization determination unit configured to perform coincidence determination of whether an absolute value of an output from the addition average unit falls within a predetermined coincidence determination range of a predetermined signal point on a signal space diagram, and determine a synchronization state of the frame synchronization based on a result of the coincidence determination.

In order to solve the above-described problems, a frame synchronization apparatus according to the present invention is a frame synchronization apparatus for establishing frame synchronization by detecting a predetermined synchronization pattern of a multi-frame signal formed by a plurality of frames, comprising a multi-frame synchronization pattern insertion unit configured to insert, to each of the plurality of frames, at least one synchronization pattern of at least one kind of at least two kinds of synchronization patterns each formed by a plurality of symbols, and insert, as a multi-frame synchronization sequence, at least one synchronization pattern of at least one kind in a predetermined sequence over a plurality of frames from a head of the multi-frame signal, a synchronization pattern determination unit configured to calculate, for each symbol, a distance between the synchronization pattern and a received signal corresponding to the synchronization pattern, and determine the kind of the synchronization pattern whose average value of the distances is smallest, and a multi-frame synchronization sequence determination unit configured to determine whether a sequence of the determined synchronization pattern in the plurality of frames coincides with the multi-frame synchronization sequence within a range of a predetermined determination condition.

In order to solve the above-described problems, a frame synchronization method according to the present invention is a frame synchronization method for a frame synchronization apparatus for establishing frame synchronization by detecting a predetermined synchronization pattern included in a received signal, comprising the steps of multiplying the received signal by an inverse complex number of the predetermined synchronization pattern with respect to a predetermined signal point on a signal space diagram for each of a plurality of symbols of the received signal, performing addition averaging of outputs of the multiplication for the plurality of symbols of the received signal, and performing coincidence determination of whether an output of the addition averaging falls within a predetermined coincidence determination range of the predetermined signal point, and determining a synchronization state of the frame synchronization based on a result of the coincidence determination.

In order to solve the above-described problems, a frame synchronization method according to the present invention is a frame synchronization method for a frame synchronization apparatus for establishing frame synchronization by detecting a predetermined synchronization pattern included in a received signal, comprising the steps of multiplying the received signal by a code of each symbol of the synchronization pattern for each of a plurality of symbols of the received signal, performing addition averaging of outputs of the multiplication for the plurality of symbols of the received signal, and performing coincidence determination of whether an absolute value of an output of the addition averaging falls within a predetermined coincidence determination range of a predetermined signal point on a signal space diagram, and determining a synchronization state of the frame synchronization based on a result of the coincidence determination.

Effect of the Invention

According to the present invention, it is possible to provide a frame synchronization apparatus for correctly determining a synchronization state even if the error rate of received symbols is high, and provide a frame synchronization apparatus for correctly detecting synchronization loss while correctly establishing synchronization in multi-frame synchronization.

BRIEF DESCRIPTION OF DRAWINGS

FIG. 1A is a view showing an example of a frame structure according to the first embodiment of the present invention;

FIG. 1B is a table showing an example of a synchronization pattern (for eight symbols) according to the first embodiment of the present invention;

FIG. 2 is a view showing an example of the arrangement of a frame synchronization apparatus according to the first embodiment of the present invention;

BEST MODE FOR CARRYING OUT THE INVENTION

Figures 3A, 3B:
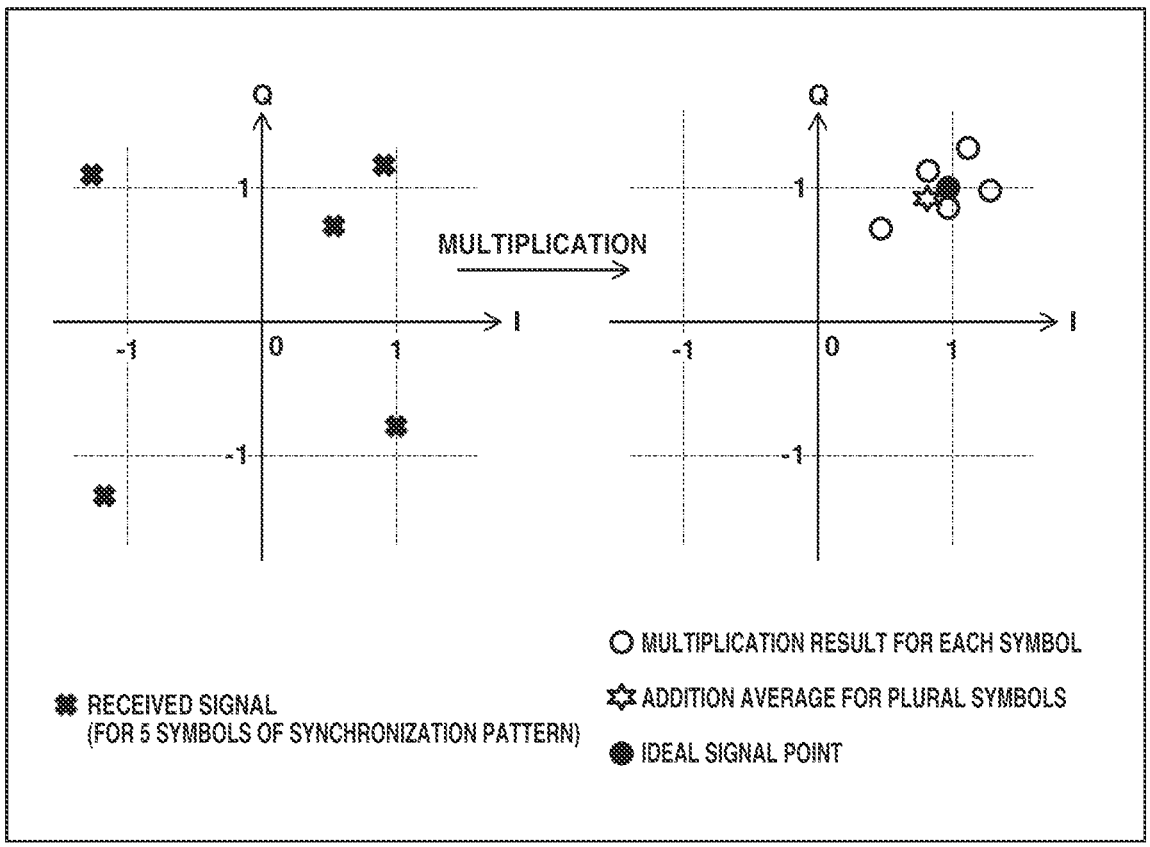
FIG. 3A is a view showing an example (five symbols) of an operation at the time of reception of a synchronization pattern according to the first embodiment of the present invention.
FIG. 3B is a table showing the example (eight symbols) of the operation at the time of reception of the synchronization pattern according to the first embodiment of the present invention.

Embodiments of the present invention will be described below with reference to the accompanying drawings. The present invention can be carried out by various embodiments, but is not limited to the embodiments to be described below.

First Embodiment

An example of a frame structure according to the first embodiment of the present invention will be described with reference to FIGS. 1A and 1B.

A received signal according to this embodiment is formed by a plurality of frames, and each frame is added with a synchronization pattern indicating the head of the frame. FIGS. 1A and 1B exemplify a case in which the received signal is a QPSK modulation signal and the synchronization pattern includes 32 symbols (8 symbols×4). Referring to FIG. 1A, if a plurality of frame signals are received, coincidence with the synchronization pattern is determined for each frame, and the results of coincidence determination for the plurality of frame signals are integrated, thereby determining a synchronization state. For example, for the 32 symbols of the synchronization pattern, coincidence determination is performed four times for every eight symbols, and a synchronization state is determined (overall synchronization determination) based on the results of coincidence determination for 16 frame signals.

<Arrangement of Frame Synchronization Apparatus>

An example of the arrangement of a frame synchronization apparatus according to the first embodiment of the present invention will be described with reference to FIG. 2. A frame synchronization apparatus 10 includes a multiplication unit 11, an addition average unit 12, a synchronization determination unit 13, and an inverse complex number calculation unit 14. For each of a plurality of symbols of a received signal, the multiplication unit 11 multiplies the received signal by an inverse complex number of the synchronization pattern with respect to a predetermined signal point on a signal space diagram. The addition average unit 12 performs addition averaging of outputs from the multiplication unit for the plurality of symbols of the received signal. The synchronization determination unit 13 performs coincidence determination of whether an output from the addition average unit 12 falls within a predetermined coincidence determination range of the predetermined signal point, and determines the synchronization state of frame synchronization based on the result of the coincidence determination. The inverse complex number calculation unit 14 calculates the inverse complex number of the synchronization pattern with respect to the predetermined signal point on the signal space diagram.

The received signal is given by equation (1) below, and is represented by a signal point decided by I and Q components on the signal space diagram. The I component represents an in-phase component, and the Q component represents a quadrature-phase component. n represents the ordinal number of a symbol of the received signal.

$$x_R(n)=I_R(n)+jQ_R(n) \quad (1)$$

The synchronization pattern at the head of the frame is determined in advance, and can be given by equation (2) below. The synchronization pattern is also represented by a signal point decided by I and Q components on the signal space diagram, similar to the received signal. n represents the ordinal number of a symbol of the synchronization pattern.

$$x_S(n)=I_S(n)+jQ_S(n) \quad (2)$$

Next, the inverse complex number calculation unit 14 defines a signal point (1+j) (I=1, Q=1) on the signal space diagram, and calculates the inverse complex number of the synchronization pattern with respect to the signal point (1+j) by equation (3) below. Note that the signal point is not limited to (1+j), and an arbitrary value on the signal space diagram can be selected.

$$(1 + j)/x_s(n) = (1 + j)/(I_s(n) + jQ_s(n)) \quad (3)$$
$$= [(I_s(n) + Q_s(n)) + j(I_s(n) - Q_s(n))]/[I_s(n)^2 + Q_s(n)^2]$$

For each of the plurality of symbols of the received signal, the multiplication unit 11 multiplies the received signal by the inverse complex number of the synchronization pattern. A multiplication result of the received signal and the inverse complex number of the synchronization pattern in the multiplication unit 11 is given by equation (4) below. The multiplication unit 11 performs multiplication the number of times equal to the number of symbols of the synchronization pattern.

$$x_R(n)*(1+j)/x_S(n) = x_R(n)*[I_S(n)+Q_S(n))+j(I_S(n))-Q_S(n))]/[I_S(n)^2+Q_S(n)^2] \quad (4)$$

The addition average unit 12 performs addition averaging of the multiplication results for the plurality of symbols. The synchronization determination unit 13 performs coincidence determination of whether the output from the addition average unit 12 falls within the predetermined coincidence determination range of the predetermined signal point (1+j), and determines the synchronization state of frame synchronization based on the result of the coincidence determination.

If the received signal coincides with the synchronization pattern, that is, if $x_R(n)=x_S(n)$, the multiplication result for each symbol is equal to the signal point (1+j). Therefore, it is possible to determine, for each symbol, coincidence/non-coincidence between the received signal and the synchronization pattern by determining whether the multiplication result of the multiplication unit 11 is equal to the signal point (1+j).

$$x_R(n)*(1+j)/x_S(n) = 1+j \quad (5)$$

<Operation at Time of Reception of Synchronization Pattern>

An example of an operation at the time of reception of a synchronization pattern according to the first embodiment of the present invention will be described with reference to FIGS. 3A and 3B. FIG. 3A assumes that a QPSK modulation signal with noise is received as a received signal, and exemplifies signal points on the signal space diagram when receiving five symbols. If the signal points of the received signal coincide with signal points of the synchronization pattern, multiplication results are moved close to the signal point (1+j) by performing multiplication by an inverse complex number.

If no noise is included at all, the multiplication results almost coincide with the signal point (1+j). However, for a QPSK modulation signal with noise, the multiplication results of the I and Q components do not coincide with the signal point (1+j) and vary, as shown in FIGS. 3A and 3B. The variation caused by noise components can be suppressed by performing addition averaging of the multiplication results for the plurality of symbols.

Note that the amplitude of the received signal is not always equal to the amplitude of a transmission signal but can be adjusted by a reception amplitude adjustment function, for example, automatic gain control on the reception side.

<Operation at Time of Reception of Symbols Other than Synchronization Pattern>

An example of an operation at the time of reception of symbols other than a synchronization pattern according to the first embodiment of the present invention will be described with reference to FIGS. 4A and 4B. Similar to FIG. 3A, FIG. 4A assumes that a QPSK modulation signal with noise is received as a received signal, and exemplifies signal points on the signal space diagram when receiving five symbols.

Figures 4A, 4B:
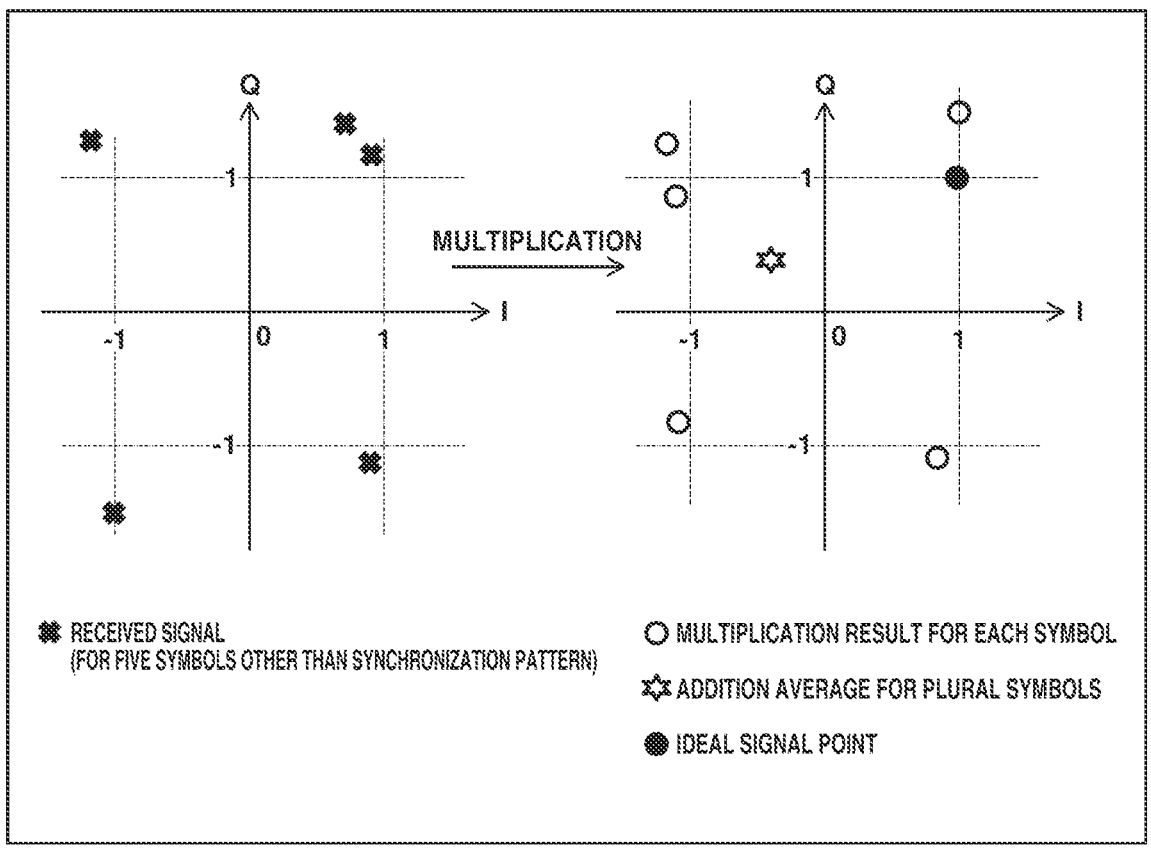
FIG. 4A is a view showing an example (five symbols) of an operation at the time of reception of symbols other than a synchronization pattern according to the first embodiment of the present invention.
FIG. 4B is a table showing the example (eight symbols) of the operation at the time of reception of the symbols other than the synchronization pattern according to the first embodiment of the present invention.

FIG. 4A illustrates signal points on the signal space diagram when receiving five symbols other than a synchronization pattern. If the received symbols other than the synchronization pattern are multiplied by inverse complex numbers of the synchronization pattern, multiplication results are not concentrated at the signal point (1+j) and dispersed to four signal points (1, 1), (−1, 1), (−1, −1), and (1, −1) on the signal space diagram unlike FIG. 3A, and the addition average of the multiplication results is close to the zero point. Ideally, when a received signal is a synchronization pattern, the addition average result for a plurality of symbols is close to the signal point (1+j); otherwise, the addition average result for a plurality of symbols is close to the zero point.

<Method of Determining Synchronization State>

Figure 5:
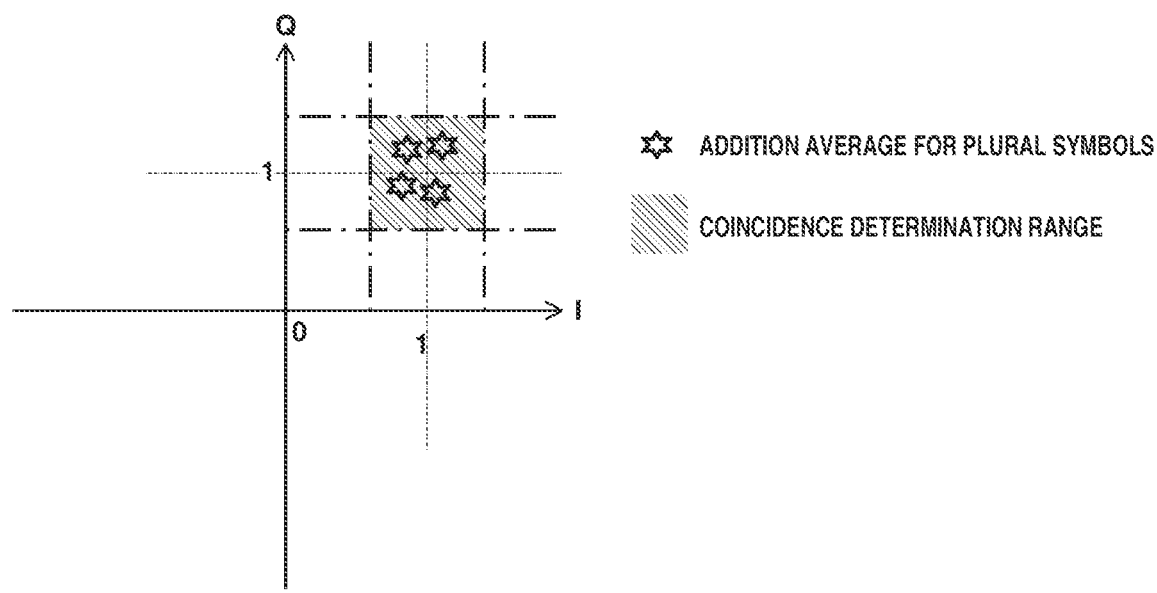
FIG. 5 is a view showing a method of determining coincidence of a synchronization pattern according to the first embodiment of the present invention.

A method of determining coincidence of a synchronization pattern according to the first embodiment of the present invention will be described with reference to FIG. 5. As described above with reference to FIGS. 3A to 4B, with respect to a QPSK signal with noise, even if noise components are suppressed by addition averaging, the addition average result does not coincide with the signal point (1+j) or the zero point. To cope with this, in this embodiment, as shown in FIG. 5, a predetermined coincidence determination range is provided around the signal point (1+j), and whether a coincidence state is obtained is determined by determining whether the addition average result falls within the predetermined coincidence determination range.

In this embodiment, if a signal including frame signals is received as shown in FIG. 1A, a known 32-symbol synchronization pattern is compared with a signal corresponding to the synchronization pattern of the received signal in one frame. More specifically, the coincidence state is determined four times for every eight symbols, and overall synchronization determination is performed based on the results of coincidence determination for n frames. For example, if a status in which four results of coincidence determination all fall within the coincidence determination range continues for the n frames (for example, n=16), synchronization is determined; otherwise, synchronization loss is determined.

Determination may be performed to allow a case in which one of four results of determination of the coincidence state falls outside the coincidence determination range. For example, even if, for six frames among 16 frames, one of four results of coincidence determination falls outside the coincidence determination range, it may be comprehensively determined that synchronization is established.

<Method of Determining Coincidence of Synchronization Pattern at Time of Phase Slip>

Figure 6A:
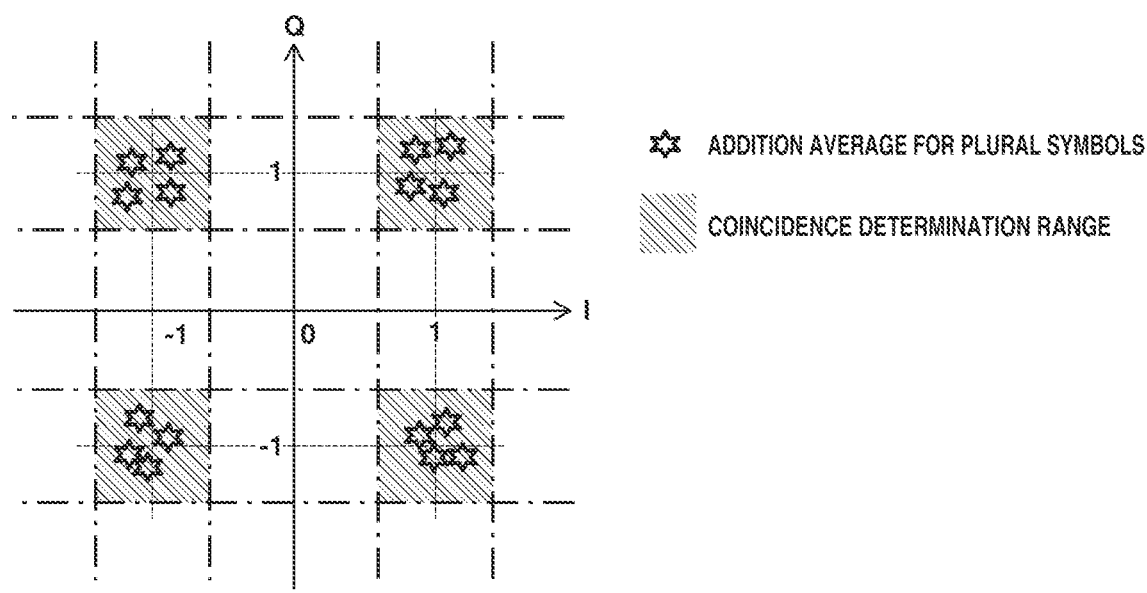
FIG. 6A is a view showing a method of determining coincidence of a synchronization pattern at the time of a phase slip according to the first embodiment of the present invention.

A method of determining coincidence of a synchronization pattern at the time of a phase slip according to the first embodiment of the present invention will be described with reference to FIGS. 6A and 6B. With respect to a PSK modulation signal, uncertainty of 90° generally occurs in carrier signal synchronization on the reception side. To implement frame synchronization in a state in which there is uncertainty of 90°, it is necessary to determine frame synchronization and maintain it even when uncertainty (phase slip) occurs.

In this embodiment, if a phase slip occurs at the time of frame synchronization, signal points of the multiplication results of the received signal and the inverse complex number of the same synchronization pattern only move among the quadrants, and thus are not dispersed to a plurality of quadrants. By using this, it is possible to cope with the phase slip by performing coincidence determination at the signal point (1+j) and respective points obtained by performing 90° phase rotation, 180° phase rotation, and 270° phase rotation of the signal point (1+j), that is, at four signal points (1+j, −1+j, −1−j, and 1−j) in total, at the time of coincidence determination after addition averaging. More specifically, by performing coincidence determination by determining whether the smallest value of the distances between an addition average result for a plurality of symbols and the above-described four signal points falls within the coincidence determination range, it is possible to determine the synchronization state even if a phase slip occurs.

For example, if +90° phase rotation occurs in a state in which the addition average result for the plurality of symbols falls within the coincidence determination range of the signal point (1+j) in the first quadrant, the addition average result for the plurality of symbols moves close to the signal point (−1+j) in the second quadrant. In this case, since the smallest value of the distances between the addition average result for the plurality of symbols and the four signal points is obtained for the signal point (−1+j) in the second quadrant, if the addition average result falls within the coincidence determination range set around the signal point (−1+j) in the second quadrant to which the shortest distance belongs, coincidence is determined; otherwise, non-coincidence is determined.

Figures 6B, 7:
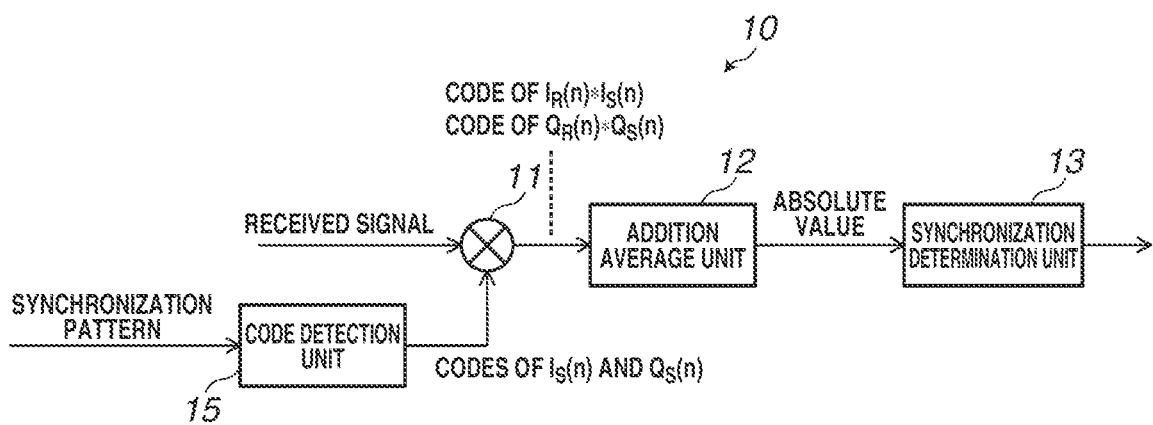
FIG. 6B is a table showing the method of determining coincidence of the synchronization pattern at the time of the phase slip (when a QPSK modulation signal without noise is received) according to the first embodiment of the present invention.
FIG. 7 is a view showing an example of the arrangement of a frame synchronization apparatus according to the second embodiment of the present invention.

For the sake of descriptive simplicity, FIG. 6B assumes that a QPSK modulation signal without noise is received as a received signal. It is known that the addition average result for the plurality of symbols obtained when phase synchronization slips by +90° coincides with the signal point (−1+j) in the second quadrant, and the synchronization state can be determined even if a phase slip occurs. Even if 180° phase rotation or 270° phase rotation occurs, the synchronization state can similarly be determined by determining coincidence with a signal point in the third or fourth quadrant.

As described above, according to the first embodiment, it is configured to determine the synchronization state of frame synchronization based on whether the addition average of the multiplication results of the received signal and the inverse complex number of the synchronization pattern with respect to a predetermined signal point coincides with the predetermined signal point. Therefore, even if the bit error rate of the received signal is high, it is possible to correctly determine the synchronization state. Furthermore, by determining coincidence with a signal point in each of a plurality of quadrants on a complex plane, it is possible to correctly determine the synchronization state even if a phase slip occurs in the received signal.

Second Embodiment

An example of the arrangement of a frame synchronization apparatus according to the second embodiment of the present invention will be described with reference to FIG. 7. In the second embodiment, a synchronization state is determined based on whether an output of addition averaging of the multiplication results of a received signal and a code of a synchronization pattern falls within a predetermined coincidence determination range.

<Arrangement of Frame Synchronization Apparatus>

A frame synchronization apparatus 10 according to the second embodiment includes a multiplication unit 11, an addition average unit 12, a synchronization determination unit 13, and a code detection unit 15. For each of a plurality of symbols of a received signal, the multiplication unit 11 multiplies the received signal and a code of a synchronization pattern. The addition average unit 12 performs addition averaging of outputs from the multiplication unit 11 for the plurality of symbols of the received signal. The synchronization determination unit 13 performs coincidence determination of whether an output from the addition average unit 12 falls within a predetermined coincidence determination range of a predetermined signal point, and determines the synchronization state of frame synchronization based on the result of the coincidence determination. The code detection unit 15 detects a code of the synchronization pattern.

Similar to the first embodiment, the received signal is given by equation (6) below, and is represented by a signal point decided by I and Q components on the signal space diagram.

$$x_R(n)=I_R(n)+jQ_R(n) \quad (6)$$

Similar to the first embodiment, the synchronization pattern is determined in advance, and can be given by equation (7) below. In the second embodiment, a BPSK modulation signal represented by $I_S(n)=Q_S(n)$ is used as the synchronization pattern.

$$x_S(n)=I_S(n)+jQ_S(n) \quad (7)$$

The frame synchronization apparatus according to this embodiment uses a code indicating the positive/negative of the synchronization pattern. The code of the synchronization pattern is detected by the code detection unit 15. In principle, the code is represented by +1 or −1. However, the present invention is not limited to this, and a code of an arbitrary magnitude can be selected.

For each of the plurality of symbols of the received signal, the multiplication unit 11 multiplies the received signal and the code of the synchronization pattern detected by the code detection unit 15.

The addition average unit 12 performs addition averaging of the multiplication results for the plurality of symbols. The synchronization determination unit 13 performs coincidence determination of whether the output from the addition average unit 12 falls within the predetermined coincidence determination range of the predetermined signal point, and determines the synchronization state of frame synchronization based on the result of the coincidence determination.

<Operation at Time of Reception of Synchronization Pattern>

Figures 8A, 8B:
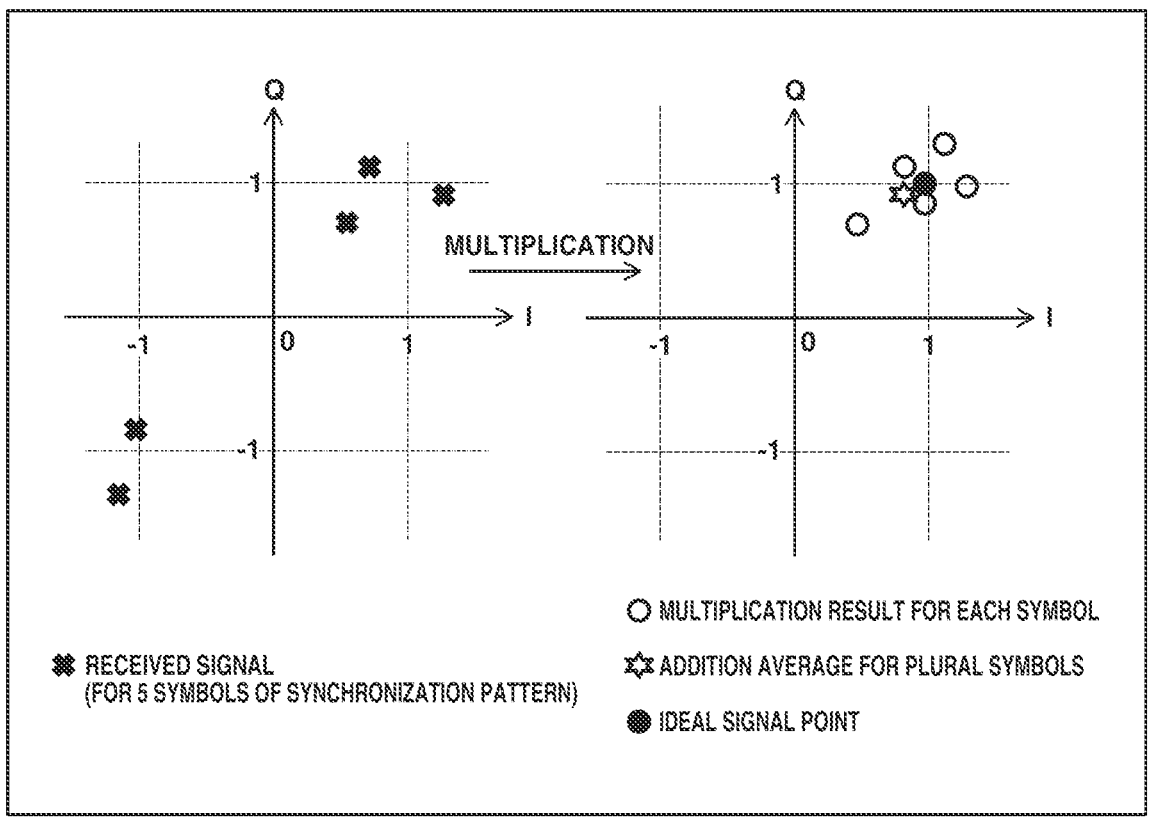
FIG. 8A is a view showing an example (five symbols) of an operation at the time of reception of a synchronization pattern according to the second embodiment of the present invention.
FIG. 8B is a table showing the example (eight symbols) of the operation at the time of reception of the synchronization pattern according to the second embodiment of the present invention.

An example of an operation at the time of reception of a synchronization pattern according to the second embodiment of the present invention will be described with reference to FIGS. 8A and 8B. FIG. 8A assumes that a QPSK modulation signal with noise is received as a received signal, and exemplifies signal points on the signal space diagram when receiving five symbols. In the second embodiment, since the synchronization pattern is a BPSK modulation signal, the received signal of the synchronization pattern is concentrated at two signal points (1+j) and (−1−j).

If the received signal is the synchronization pattern, multiplication results for respective symbols are integrated in the first quadrant, and the addition average result for the plurality of symbols is close to the ideal signal point (1+j). In the second embodiment, it is possible to integrate the multiplication results for the plurality of symbols in one quadrant by multiplying the received signal by the codes of the synchronization pattern. If no noise is included at all, the multiplication results almost coincide with the signal point (1+j). As shown in FIGS. 8A and 8B, the multiplication results of the I and Q components do not coincide with the signal point (1+j) and vary. However, the variation caused by noise components can be suppressed by performing addition averaging of the multiplication results for the plurality of symbols.

<Operation at Time of Reception of Symbols Other Than Synchronization Pattern>

An example of an operation at the time of reception of symbols other than a synchronization pattern according to the second embodiment of the present invention will be described with reference to FIGS. 9A and 9B. Similar to FIG. 8A, FIG. 9A assumes that a QPSK modulation signal with noise is received as a received signal, and exemplifies signal points on the signal space diagram when receiving five symbols.

Figures 9A, 9B:
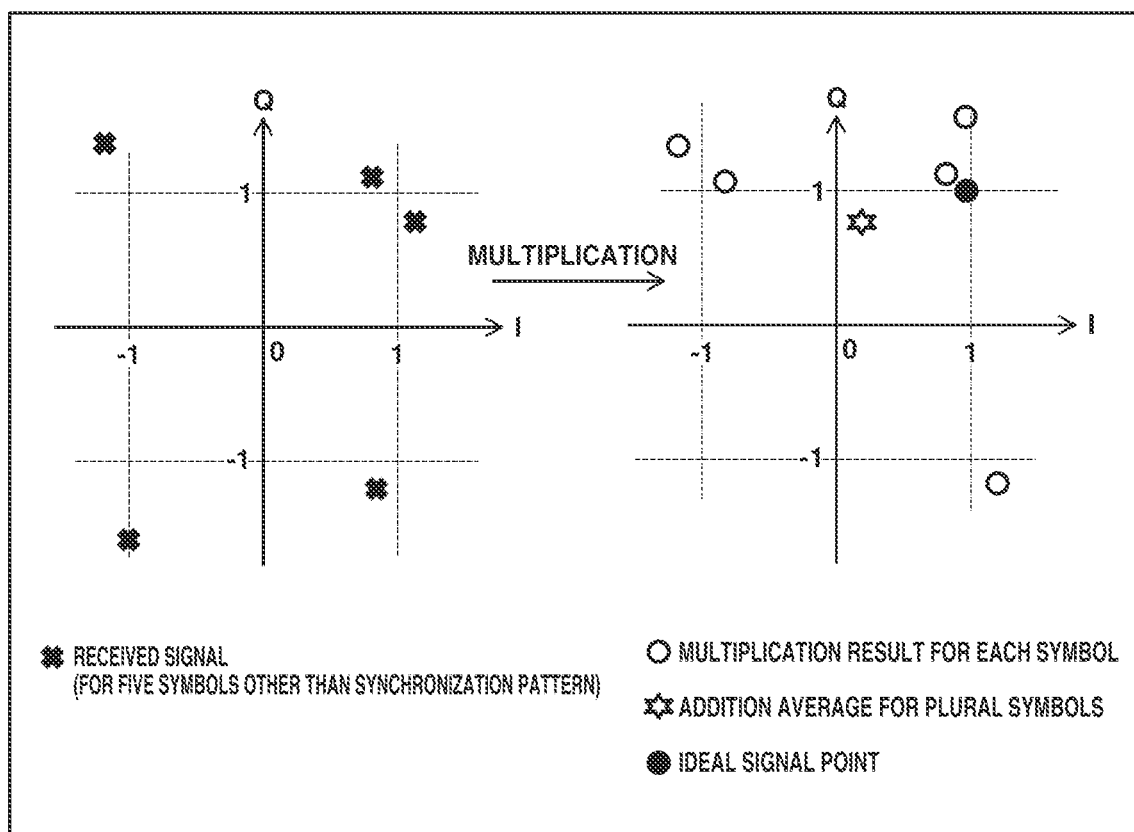
FIG. 9A is a view showing an example (five symbols) of an operation at the time of reception of symbols other than a synchronization pattern according to the second embodiment of the present invention.
FIG. 9B is a table showing the example (eight symbols) of the operation at the time of reception of the symbols other than the synchronization pattern according to the second embodiment of the present invention.

FIG. 9A illustrates signal points on the signal space diagram when receiving five symbols other than a synchronization pattern. Since the received signal is a QPSK modulation signal not corresponding to the synchronization pattern, four signal points can be taken. Even if the I and Q components of such received signal are multiplied by the codes of the I and Q components of the synchronization pattern, the multiplication results for the plurality of symbols are not integrated in one quadrant. Referring to FIGS. 9A and 9B, the multiplication results for the respective symbols are dispersed to three quadrants, and the addition average result for the plurality of symbols does not become closer to the ideal signal point (1+j), thereby making it possible to determine that the received signal other than the synchronization pattern is obtained.

<Method of Determining Synchronization State>

Figure 10:
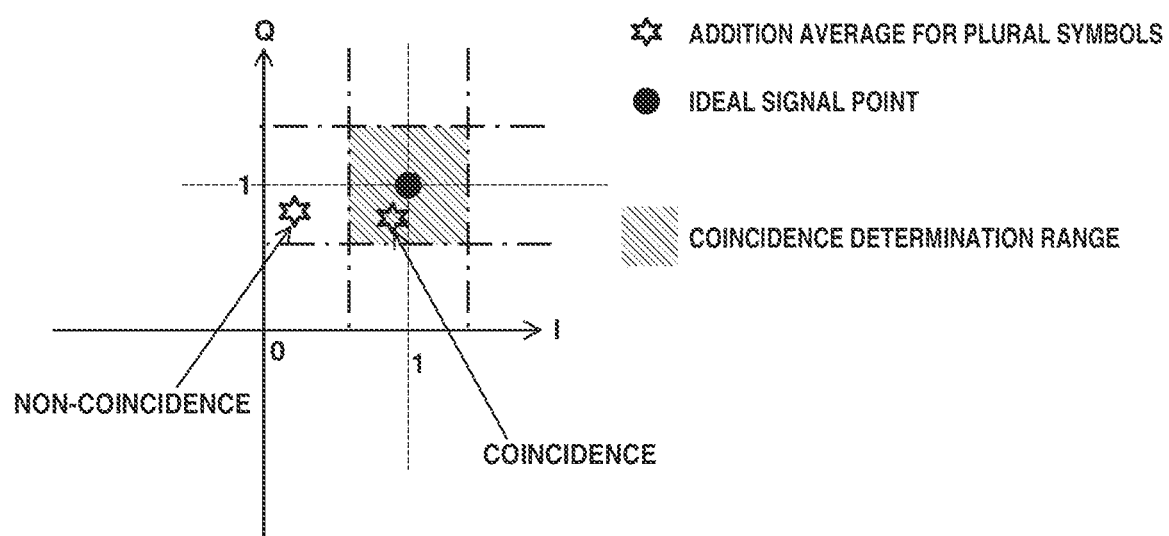
FIG. 10 is a view showing a method of determining coincidence of a synchronization pattern according to the second embodiment of the present invention.

A method of determining coincidence of a synchronization pattern according to the second embodiment of the present invention will be described with reference to FIG. 10. In the second embodiment as well, similar to the first embodiment, coincidence determination is performed based on whether the addition average of the outputs from the multiplication unit falls within the coincidence determination range of the signal point.

In the second embodiment, when determining coincidence with the synchronization pattern of the received signal, the following determination conditions are used. If at least one of the following determination conditions is satisfied, coincidence can be determined.

(1) Both the addition averages of the I and Q components fall within a predetermined value range (coincidence determination range)

(2) One of the addition averages of the I and Q components falls within the predetermined value range (3) The sum of the addition averages of the I and Q components falls within the predetermined value range (4) The product of the addition averages of the I and Q components falls within the predetermined value range In the example shown in FIGS. 9A and 9B, since the addition average value of the Q components of the received signal is relatively close to that of the Q components of the synchronization pattern, it may be impossible to correctly determine coincidence using only the Q components. In this case, by using both the determination results of the I and Q components, it is possible to correctly determine coincidence/non-coincidence. For example, under the determination condition of (3), the coincidence state is determined based on whether the sum of the addition averages of the I and Q components is close to 2.

In the second embodiment as well, similar to the first embodiment, coincidence with the synchronization pattern is determined for each frame, and overall synchronization determination is performed based on the results of coincidence determination for the plurality of frames.

Similar to the first embodiment, if a signal including frame signals is received, as shown in FIG. 1A, whether the coincidence state is obtained is determined four times for every eight symbols of the 32-symbol synchronization pattern in one frame, and overall synchronization determination is performed based on the determination results for n frames. For example, if a status in which four results of coincidence determination all fall within the coincidence determination range continues for the n frames (for example, n=16), synchronization is determined; otherwise, synchronization loss is determined. Determination may be performed to allow a case in which one of four results of coincidence determination falls outside the coincidence determination range.

<Method of Determining Coincidence of Synchronization Pattern at Time of Phase Slip>

As described in the first embodiment, with respect to a PSK modulation signal, uncertainty of 90° occurs in carrier signal synchronization on the reception side. To implement frame synchronization in a state in which there is uncertainty of 90°, it is necessary to maintain frame synchronization even when uncertainty (phase slip) occurs. In the second embodiment, by using the absolute value of the addition average, it is possible to determine the synchronization state even if a phase slip occurs.

Figures 11A, 11B:
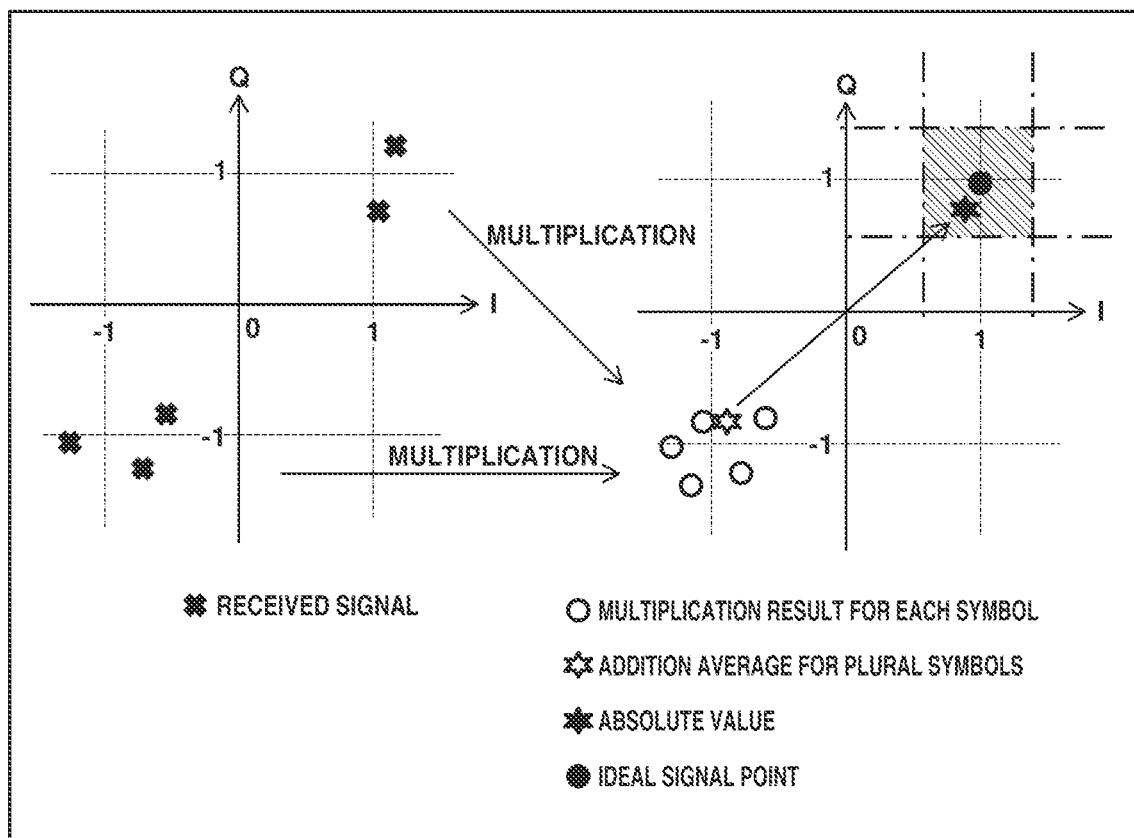
FIG. 11A is a view showing a method (five symbols) of determining coincidence of a synchronization pattern at the time of a phase slip of 180° according to the second embodiment of the present invention.
FIG. 11B is a table showing the method (eight symbols) of determining coincidence of the synchronization pattern at the time of a phase slip of 180° according to the second embodiment of the present invention.

A method of determining coincidence of a synchronization pattern at the time of a phase slip of 180° according to the second embodiment of the present invention will be described with reference to FIGS. 11A and 11B. In a received signal shown in FIGS. 11A and 11B, a phase slip of 180° occurs with respect to the received signal shown in FIGS. 8A and 8B. If the received signal is multiplied by each of the codes of the I and Q components of the synchronization pattern, the multiplication results for the respective symbols are integrated in the third quadrant, and the addition average for the plurality of symbols becomes closer to the signal point (−1−j). Then, since the absolute value of this value becomes closer to the signal point (1+j), it is possible to determine coincidence/non-coincidence with the synchronization pattern based on whether the absolute value of the addition average falls within the coincidence range of the signal point (1+j).

Figures 12A, 12B:
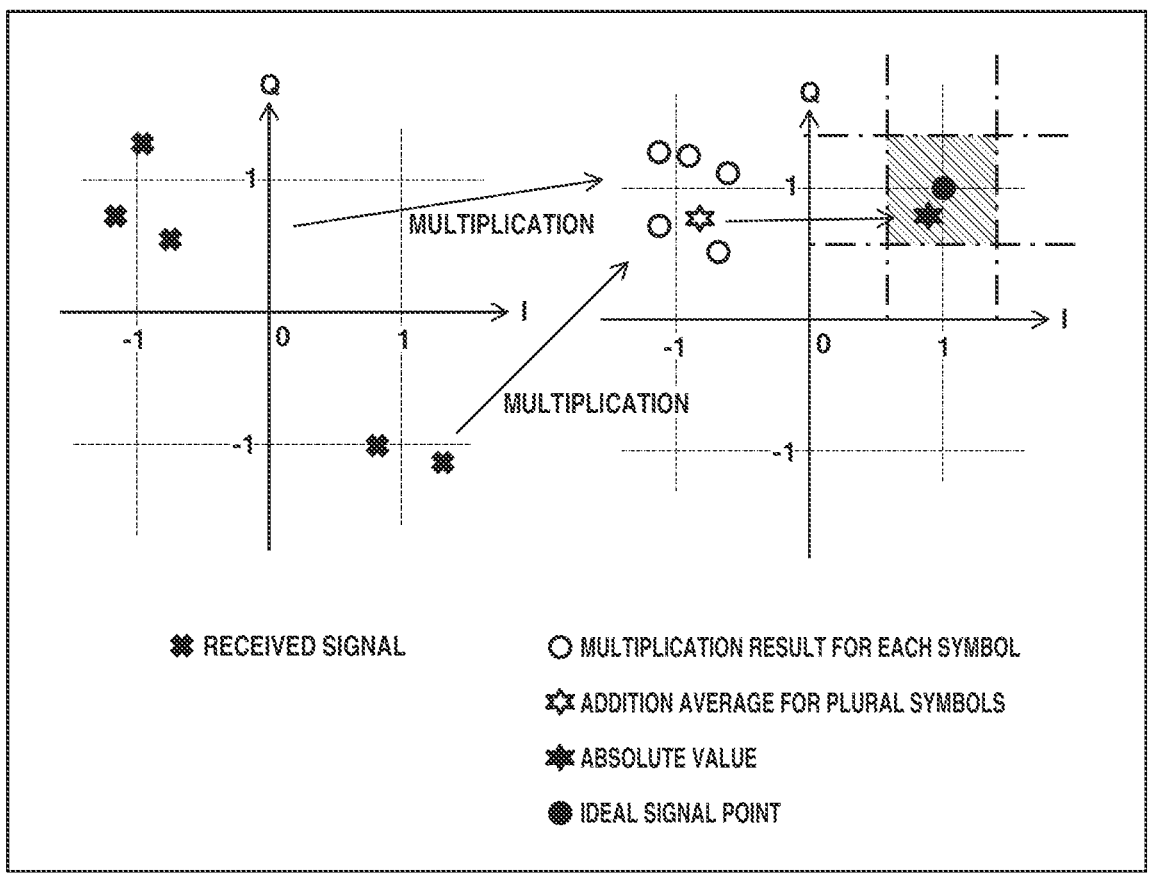
FIG. 12A is a view showing a method (five symbols) of determining coincidence of a synchronization pattern at the time of a phase slip of 90° according to the second embodiment of the present invention.
FIG. 12B is a table showing the method (eight symbols) of determining coincidence of the synchronization pattern at the time of a phase slip of 90° according to the second embodiment of the present invention.

A method of determining coincidence of a synchronization pattern at the time of a phase slip of 90° according to the second embodiment of the present invention will be described with reference to FIGS. 12A and 12B. In a received signal shown in FIGS. 12A and 12B, a phase slip of 90° occurs with respect to the received signal shown in FIGS. 8A and 8B. If the received signal is multiplied by each of the codes of the I and Q components of the synchronization pattern, the multiplication results for the respective symbols are integrated in the second quadrant, and the addition average for the plurality of symbols becomes closer to the signal point (−1+j). Then, since the absolute value of this value becomes closer to the signal point (1+j), it is possible to determine coincidence/non-coincidence with the synchronization pattern based on whether the absolute value falls within the coincidence range of the signal point (1+j), similar to FIGS. 8A and 8B.

As described above, according to the second embodiment, it is configured to determine the synchronization state of a frame synchronization based on whether the addition average of the multiplication results of the received signal and the code of the synchronization pattern coincides with the predetermined signal point. Therefore, even if the bit error rate of the received signal is high, it is possible to correctly determine the synchronization state. Furthermore, by using the absolute value of the addition average for the plurality of symbols, it is possible to determine the synchronization state even if a phase slip occurs.

<Effect of Applying Frame Synchronization Apparatus>

Figure 13:
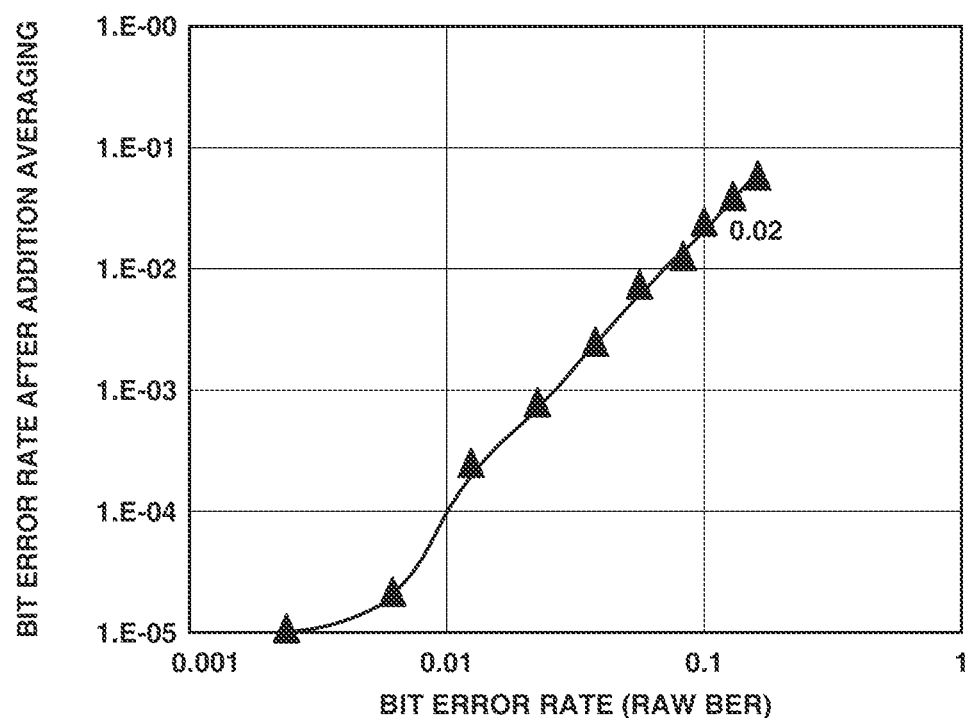
FIG. 13 is a graph for explaining a noise suppression effect in the frame synchronization apparatus according to the present invention.

A noise suppression effect in the frame synchronization apparatus according to the present invention will be described with reference to FIG. 13. The abscissa represents a bit error rate (to be referred to as "RAW BER" hereinafter) when noise is added to a received signal, and the ordinate represents a bit error rate after performing addition averaging of multiplication results for eight symbols having a RAW BER.

For example, when RAW BER=0.1, the bit error rate after performing addition averaging is 0.02. This indicates that noise components are averaged by executing addition averaging for eight symbols, and a noise level at BER=0.1 is suppressed to a noise level at BER=0.02.

As described above, the frame synchronization apparatus according to this embodiment can reduce, by performing addition averaging of the multiplication results for symbols, the error rate when determining a synchronization pattern. Thus, it is possible to accurately determine the synchronization state even in a high-error rate status, thereby improving tolerance to synchronization maintenance.

Figure 14:
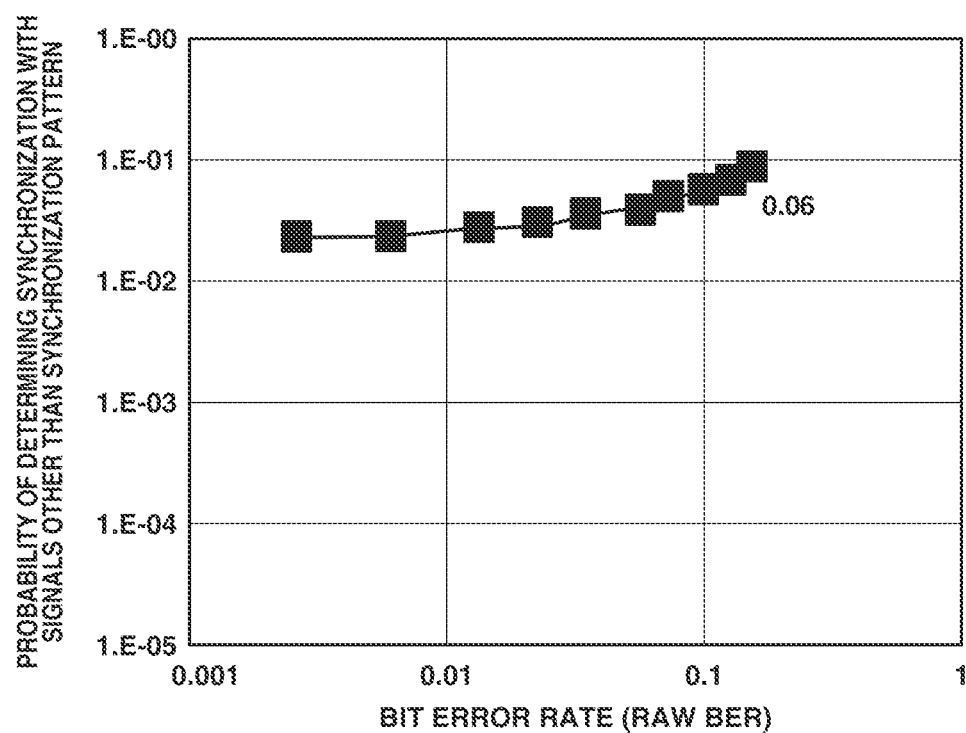
FIG. 14 is a graph for explaining a noise suppression effect in the frame synchronization apparatus according to the present invention.

A noise suppression effect in the frame synchronization apparatus according to the present invention will be described with reference to FIG. 14. The abscissa represents a RAW BER, similar to FIG. 13, and the ordinate represents a probability of determining synchronization with signals other than a synchronization pattern.

For example, when RAW BER=0.1, the probability of determining synchronization with signals other than a synchronization pattern is 0.06. By performing addition averaging of multiplication results for symbols according to the present invention, it is possible to reduce the probability of erroneously determining synchronization. This indicates that noise components are suppressed to reduce the probability of erroneously determining synchronization by performing addition averaging of multiplication results for the symbols.

As described above, the frame synchronization apparatus according to this embodiment can reduce, by performing addition averaging of the multiplication results for symbols, the probability of erroneously detecting a synchronization pattern. Thus, it is possible to accurately determine the synchronization state even in a high-error rate status, thereby improving tolerance to synchronization maintenance.

Third Embodiment

An example of the arrangement of a frame synchronization apparatus according to the third embodiment of the present invention will be described with reference to FIG. 15. In the third embodiment, multi-frame synchronization is established by detecting a predetermined synchronization pattern of a multi-frame signal formed by a plurality of frames.

<Arrangement of Frame Synchronization Apparatus>

To establish multi-frame synchronization in a multi-frame signal, it is necessary to detect the head of a multi-frame. A multi-frame synchronization pattern for detecting the head of the multi-frame is inserted to a transmission signal in a multi-frame synchronization pattern insertion unit 21 on the transmission side, a synchronization pattern determination unit 24 on the reception side determines the multi-frame synchronization pattern, and a multi-frame synchronization sequence determination unit 25 performs multi-frame synchronization determination.

<Structure of Multi-Frame Signal>

An example of the structure of a multi-frame signal according to the third embodiment of the present invention will be described with reference to FIG. 16. In this embodiment, two kinds of multi-frame synchronization patterns each formed by a plurality of symbols are each inserted to the head region of each frame from the head of the multi-frame signal over a plurality of frames. In an example shown in FIG. 16, two kinds of patterns, that is, mark patterns M and space patterns S each formed by a plurality of symbols are defined as multi-frame synchronization patterns. On the reception side, to perform multi-frame synchronization determination, the mark patterns M and the space patterns S are detected in each frame.

Figure 16:
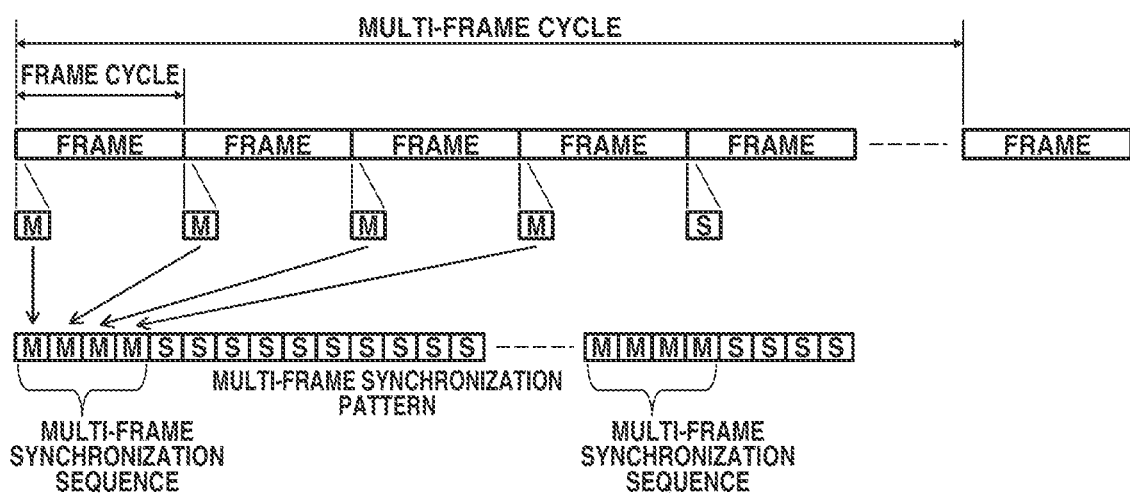
FIG. 16 is a view showing an example of the structure of a multi-frame signal according to the third embodiment of the present invention.

In the example shown in FIG. 16, the mark patterns M are inserted to each of four frames from the head of the multi-frame signal, and the head of the multi-frame is defined as a multi-frame synchronization sequence including four consecutive mark patterns M. The multi-frame synchronization sequence is not limited to this, and another sequence can be used as a multi-frame synchronization sequence. For example, a synchronization pattern inserted to four or more frames may be used, or a multi-frame synchronization sequence may be formed by inserting two or more kinds of synchronization patterns or two or more synchronization patterns to the head of each frame.

<Mark Patterns and Space Patterns>

Figure 17A:
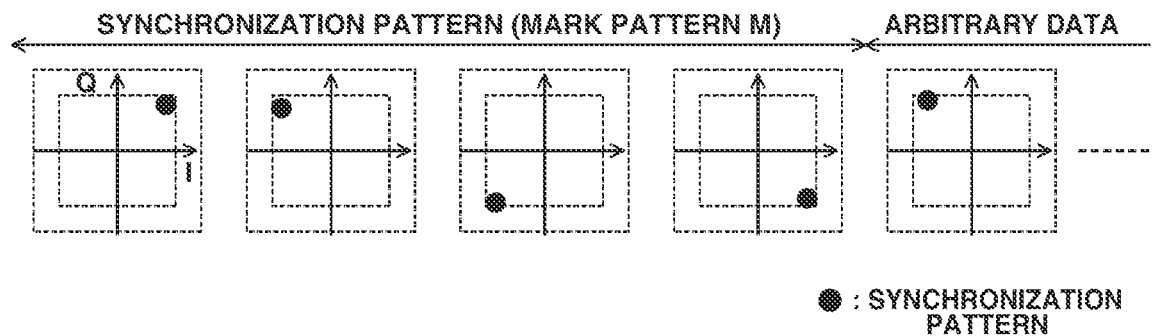
FIG. 17A is a view showing an example of mark patterns M in a multi-frame according to the third embodiment of the present invention.
Figure 17B:
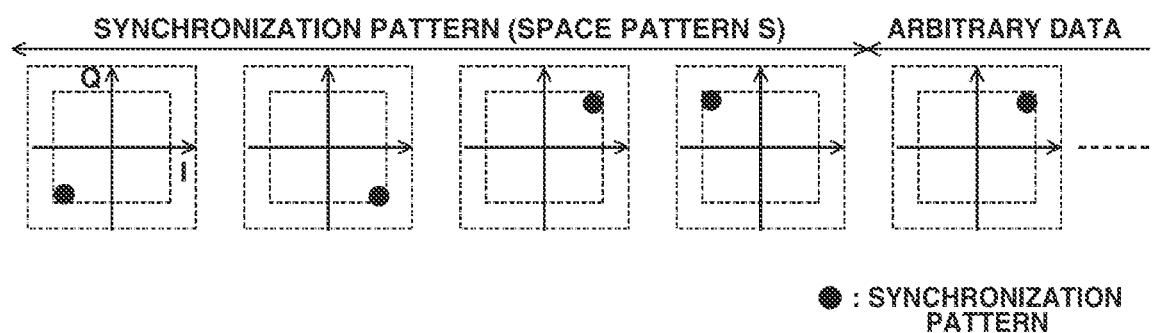
FIG. 17B is a view showing an example of space patterns S in the multi-frame according to the third embodiment of the present invention.

Examples of the mark patterns M and the space patterns S of the multi-frame signal according to the third embodiment of the present invention will be described with reference to FIGS. 17A and 17B. Each pattern is represented by coordinates (I, Q) on the signal space diagram for each symbol.

The mark patterns M are represented by four symbols (1, 1), (−1, 1), (−1, −1), and (1, −1), and the space patterns S is represented by four symbols (−1, −1), (1, −1), (1, 1), and (−1, 1). By viewing each symbol, the signal point of the mark patterns M and that of the space patterns S are located on a diagonal line (symmetrically about the origin), and a sufficient distance is taken. Note that FIGS. 17A and 17B each show an example of a pattern length of four symbols. The present invention is not limited to this and, for example, eight symbols can form a pattern.

<Multi-Frame Synchronization Determination>

Figure 15:
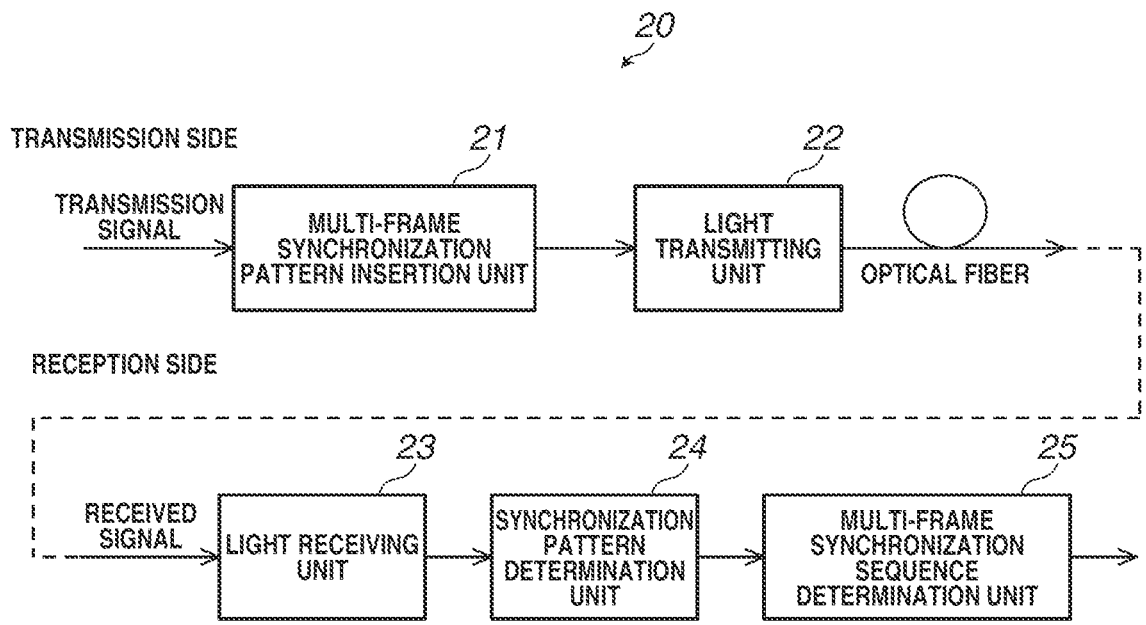
FIG. 15 is a view showing an example of the arrangement of a multi-frame synchronization apparatus according to the third embodiment of the present invention.
Figure 18A:
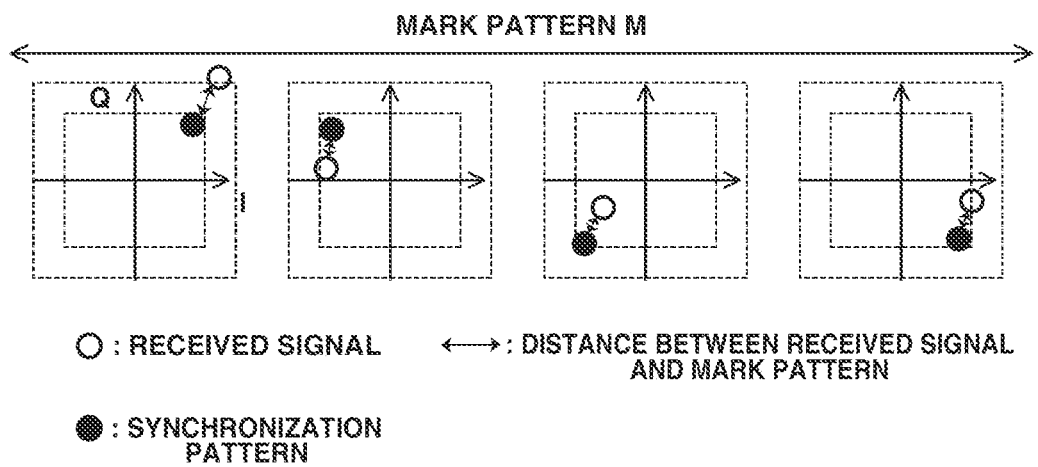
FIG. 18A is a view showing the distance between a received signal and the mark patterns M according to the third embodiment of the present invention.
Figure 18B:
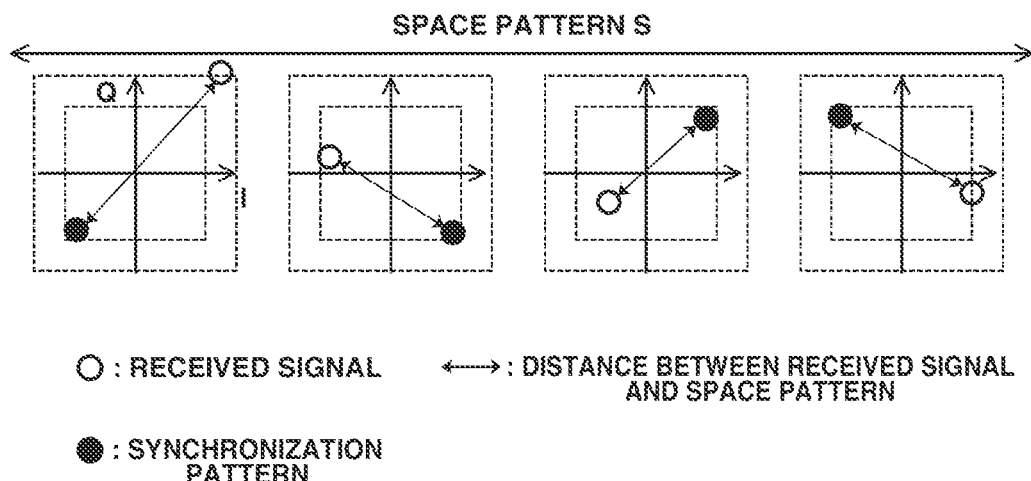
FIG. 18B is a view showing the distance between a received signal and the space patterns S according to the third embodiment of the present invention.

Multi-frame synchronization determination is performed by the synchronization pattern determination unit 24 and the multi-frame synchronization sequence determination unit 25 shown in FIG. 15. The distance between a received signal and the mark patterns M or the space patterns S according to the third embodiment of the present invention will be described with reference to FIG. 18A or 18B. FIGS. 18A and 18B show a case in which the received signal contains the mark patterns M.

On the reception side, the synchronization pattern determination unit 24 calculates a distance between each symbol of the received signal and each symbol of the mark patterns M, and a distance between each symbol of the received signal and each symbol of the space patterns S. The coordinates of the mark patterns M and the space patterns S are preset on the reception side based on coordinates set on the transmission side. At this time, for a pattern length N (four symbols in the above-described example) of the mark patterns M and the space patterns S, the calculated distances are averaged, and likelihood determination of determining that the received pattern is a pattern with a shorter distance is performed.

Note that the distance between the received symbol and the pattern is obtained by the root of the sum of the square of the difference on the I-axis and the square of the difference on the Q-axis. However, the magnitude of the distance can be determined using the sum of the squares of the differences on the I- and Q-axes. The average value is obtained by dividing an accumulated value by a cumulative number. However, since the cumulative number is the same, the magnitude of the average value can be determined by comparing the accumulated values with each other.

The accumulated value of the distances between the symbols of the received signal and the symbols of the mark patterns M is given by expression (8) below. Furthermore, the accumulated value of the distances between the symbols of the received signal and the symbols of the space patterns S is given by expression (9) below. RcvXi and RcvXq represent coordinate values (I, Q) of the received signal on the X-polarization side, RefMXi and RefMXq represent coordinate values (I, Q) of the mark patterns M on the X-polarization side, and RefSXi and RefSXq represent coordinate values (I, Q) of the space patterns S on the X-polarization side.

$$\sum_{i=0}^{N-1}(RcvXi-RefMXi)^2+(RcvXq-RefMXq)^2 \quad (8)$$

$$\sum_{i=0}^{N-1}(RcvXi-RefSXi)^2+(RcvXq-RefSXq)^2 \quad (9)$$

Note that the above-described multi-frame synchronization determination assumes that compensation for a phase slip in phase modulation is performed in advance, and processing for a phase slip is not described.

The multi-frame synchronization sequence determination unit 25 shown in FIG. 15 determines whether the mark pattern determined by the synchronization pattern determination unit 24 is detected consecutively for four frames. If the mark pattern is detected consecutively for four frames, the head part of the multi-frame is determined. Note that as a determination condition, a predetermined non-coincidence condition (for example, non-coincidence is determined for one of eight frames) may be allowed. This non-coincidence condition can be set appropriately from an error rate status in data transmission, and can thus be optimized.

In a general transmission path, a received signal is added with noise, and variations of the received signals have a distribution similar to a Gaussian distribution. Therefore, in the multi-frame synchronization state, the distances between the symbols of the received signal and the symbols of the mark patterns M also have a distribution similar to a Gaussian distribution. When $\mu$ and $\sigma^2$ represent the average and variance of the Gaussian distribution, respectively, if N elements are averaged, the average value approaches $\mu$ by the central limit theorem, and the distribution width is given by $\sigma/\sqrt{N}$. With respect to the squared value of the distance, the distribution width after averaging is $1/\sqrt{N}$ of that before averaging.

A noise suppression effect is obtained by averaging, and it is possible to reduce the error rate when determining the mark patterns M and the space patterns S even under a high-error rate condition. This makes it possible to correctly determine the head of a multi-frame under the high-error rate condition.

If the received signal on the Y-polarization side is taken into consideration, the average value of the distances between the symbols of the received signal and the symbols of the mark patterns M on the X- and Y-polarization sides is given by expression (10) below. Furthermore, the average value of the distances between the symbols of the received signal and the symbols of the space patterns S on the X- and Y-polarization sides are given by expression (11) below. RcvYi and RcvYq represent coordinate values (I, Q) of the received signal on the Y-polarization side, RefMYi and RefMYq represent coordinate values (I, Q) of the mark patterns M on the Y-polarization side, and RefSYi and RefSYq represent coordinate values (I, Q) of the space patterns S on the Y-polarization side.

$$\sum_{i=0}^{N-1}(RcvXi-RefMXi)^2+(RcvXq-RefMXq)^2+ \quad (10)$$
$$(RcvYi-RefMYi)^2+(RcvYq-RefMYq)^2$$

$$\sum_{i=0}^{N-1}(RcvXi-RefSXi)^2+(RcvXq-RefSXq)^2+ \quad (11)$$
$$(RcvYi-RefSYi)^2+(RcvYq-RefSYq)^2$$

Note that the above-described multi-frame synchronization determination assumes that compensation for a phase slip in phase modulation is performed in advance. Therefore, this determination sequence does not cope with a phase slip.

As described above, when Y-polarization is also taken into consideration, a noise suppression effect is similarly obtained by averaging, and it is possible to reduce the error rate when determining the mark patterns M and the space patterns S even under the high-error rate condition. Therefore, it is possible to correctly determine the head of a multi-frame under the high-error rate condition.

Other Embodiments

Figure 19:
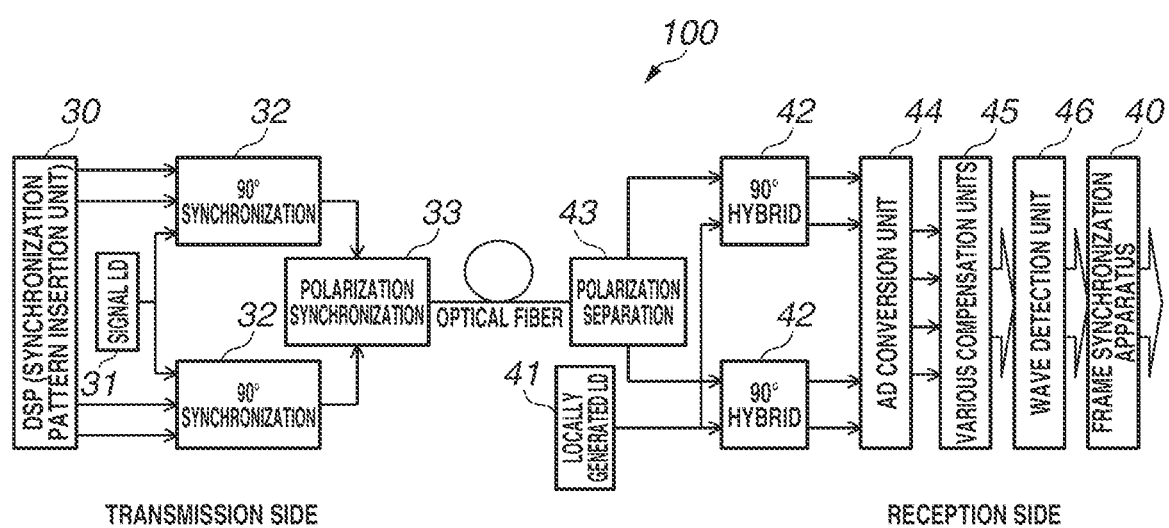
FIG. 19 is a view showing an example of the arrangement of a coherent optical communication apparatus including a frame synchronization apparatus according to an embodiment of the present invention.

An example of the arrangement of a coherent optical communication apparatus including a frame synchronization apparatus according to an embodiment of the present invention will be described with reference to FIG. 19. A coherent optical communication apparatus 100 is formed by a transmission-side apparatus and a reception-side apparatus. A synchronization pattern insertion unit is implemented in a transmission-side digital signal processing unit 30, and a frame synchronization apparatus 40 is implemented after a reception-side wave detection unit 46. By implementing the frame synchronization apparatus of this embodiment in the coherent optical communication apparatus, it is possible to correctly establish synchronization, maintain the synchronization state, and accurately determine the synchronization state even if the bit error rate of a received signal is high.

INDUSTRIAL APPLICABILITY

The present invention can be used as a frame synchronization apparatus for determining the state of frame synchronization in an optical communication apparatus for coherent optical communication.

EXPLANATION OF THE REFERENCE NUMERALS AND SIGNS

10 . . . frame synchronization apparatus, 11 . . . multiplication unit, 12 . . . addition average unit, 13 . . . synchronization determination unit, 14 . . . inverse complex number calculation unit, 15 . . . code detection unit, 20 . . . frame synchronization apparatus (multi-frame), 21 . . . multi-frame synchronization pattern insertion unit, 22 . . . light transmitting unit, 23 . . . light receiving unit, 24 . . . synchronization pattern determination unit, 25 . . . multi-frame synchronization sequence determination unit, 30 . . . digital signal processing unit, 40 . . . frame synchronization apparatus (optical communication apparatus), 100 . . . coherent optical communication apparatus

The invention claimed is:

1. A frame synchronization apparatus for establishing frame synchronization by detecting a predetermined synchronization pattern included in a received signal, comprising:
a multiplication unit configured to multiply the received signal by an inverse complex number of the predetermined synchronization pattern with respect to a predetermined signal point on a signal space diagram for each of a plurality of symbols of the received signal;
an addition average unit configured to perform addition averaging of outputs from the multiplication unit for the plurality of symbols of the received signal; and
a synchronization determination unit configured to perform coincidence determination of whether an output from the addition average unit falls within a predetermined coincidence determination range of the predetermined signal point, and determine a synchronization state of the frame synchronization based on a result of the coincidence determination.

2. The frame synchronization apparatus according to claim 1, wherein the synchronization determination unit determines the synchronization state of the frame synchronization based on the result of the coincidence determination for a plurality of frames.

3. The frame synchronization apparatus according to claim 1, wherein the synchronization determination unit calculates a smallest value of distances between the output from the addition average unit and the predetermined signal point and respective signal points obtained by performing 90° phase rotation, 180° phase rotation, and 270° phase rotation of the predetermined signal point, and performs coincidence determination of whether the output from the addition average unit falls within the coincidence determination range in a quadrant on the signal space diagram to which the smallest value belongs.

4. An optical communication apparatus comprising a frame synchronization apparatus defined in claim 1.

5. A frame synchronization apparatus for performing frame synchronization by detecting a predetermined synchronization pattern included in a received signal, comprising:
a multiplication unit configured to multiply the received signal by a code of each symbol of the synchronization pattern for each of a plurality of symbols of the received signal;
an addition average unit configured to perform addition averaging of outputs from the multiplication unit for the plurality of symbols of the received signal; and
a synchronization determination unit configured to perform coincidence determination of whether an absolute value of an output from the addition average unit falls within a predetermined coincidence determination range of a predetermined signal point on a signal space diagram, and determine a synchronization state of the frame synchronization based on a result of the coincidence determination.

6. The frame synchronization apparatus according to claim 5, wherein the synchronization pattern comprises a BPSK modulation signal.

7. The frame synchronization apparatus according to claim 6, wherein the multiplication unit performs at least one of multiplication of an in-phase component of the received signal and a code of an in-phase component of the synchronization pattern and multiplication of a quadrature-phase component of the received signal and a code of a quadrature-phase component of the synchronization pattern.

8. The frame synchronization apparatus according to claim 7, wherein the synchronization determination unit determines the synchronization state of the frame synchronization based on a result of at least one of
coincidence determination of whether both the absolute values of the in-phase component and the quadrature-phase component fall within the predetermined coincidence determination range,
coincidence determination of whether one of the absolute values of the in-phase component and the quadrature-phase component falls within the predetermined coincidence determination range,
coincidence determination of whether a sum of the absolute values of the in-phase component and the quadrature-phase component falls within the predetermined coincidence determination range, and
coincidence determination of whether a product of the absolute values of the in-phase component and the quadrature-phase component falls within the predetermined coincidence determination range.

9. An optical communication apparatus comprising a frame synchronization apparatus defined in claim 5.

10. A frame synchronization method for a frame synchronization apparatus for establishing frame synchronization by detecting a predetermined synchronization pattern included in a received signal, comprising the steps of:
multiplying the received signal by an inverse complex number of the predetermined synchronization pattern with respect to a predetermined signal point on a signal space diagram for each of a plurality of symbols of the received signal;
performing addition averaging of outputs of the multiplication for the plurality of symbols of the received signal; and
performing coincidence determination of whether an output of the addition averaging falls within a predetermined coincidence determination range of the predetermined signal point, and determining a synchronization state of the frame synchronization based on a result of the coincidence determination.

11. A frame synchronization method for a frame synchronization apparatus for establishing frame synchronization by detecting a predetermined synchronization pattern included in a received signal, comprising the steps of:
- multiplying the received signal by a code of each symbol of the synchronization pattern for each of a plurality of symbols of the received signal;
- performing addition averaging of outputs of the multiplication for the plurality of symbols of the received signal; and
- performing coincidence determination of whether an absolute value of an output of the addition averaging falls within a predetermined coincidence determination range of a predetermined signal point on a signal space diagram, and determining a synchronization state of the frame synchronization based on a result of the coincidence determination.

* * * * *